March 10, 1925.                                              1,528,881
O. V. JEFFERIS
WATER VAPORIZER FOR INTERNAL COMBUSTION ENGINES
Filed May 17, 1924
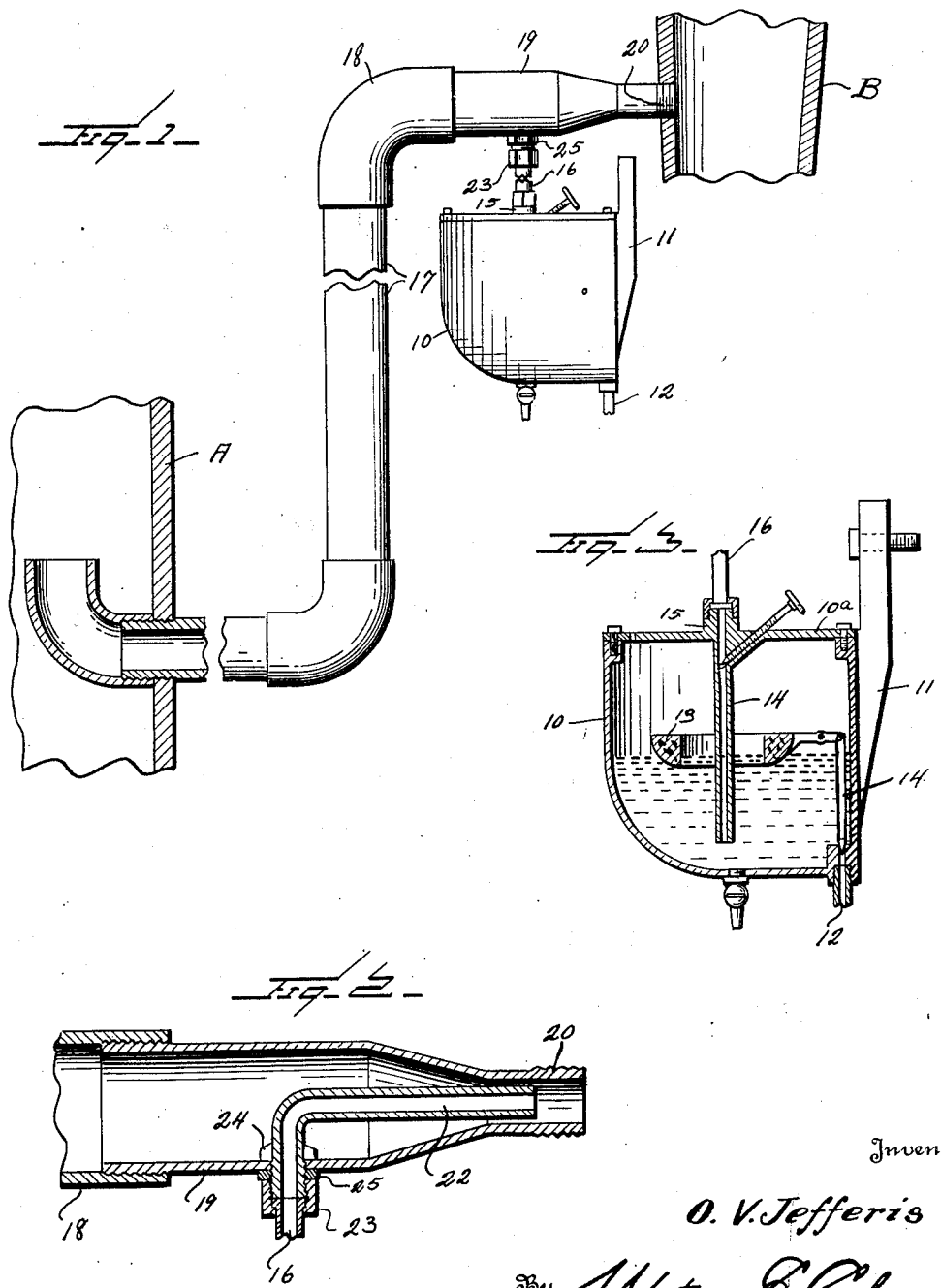
Inventor
O. V. Jefferis
By Watson E. Coleman
Attorney Patented Mar. 10, 1925.

1,528,881

UNITED STATES PATENT OFFICE.

OAK V. JEFFERIS, OF BEATRICE, NEBRASKA, ASSIGNOR OF ONE-HALF TO FRANK O. LUNDGREN, OF BEATRICE, NEBRASKA.

WATER VAPORIZER FOR INTERNAL-COMBUSTION ENGINES.

Application filed May 17, 1924. Serial No. 714,080.

*To all whom it may concern:*

Be it known that I, OAK V. JEFFERIS, a citizen of the United States, residing at Beatrice, in the county of Gage and State of Nebraska, have invented certain new and useful Improvements in Water Vaporizers for Internal-Combustion Engines, of which the following is a specification, reference being had to the accompanying drawings.

This invention relates to vaporizers for vaporizing water and mixing the water with gasoline vapor for internal combustion engines.

The object of this invention is to cause water to be vaporized so it will thoroughly mix with the vaporized gasoline or fuel for internal combustion engines.

It is well known that the heat of the explosion in the cylinder of an internal combustion engine turns the vaporized water into dry steam and this prevents the oil from burning off the cylinder walls and prevents the collection of carbon on the cylinder walls. Furthermore, it keeps the engine cool. The steam formed in the cylinders at the time of the explosion develops much extra power which will be a considerable saving in the use of gasoline, and by preventing the burning of the lubricating oil a further saving in oil is secured.

A further object of the invention is to provide a mechanism of this character which can be readily attached to any automobile, truck, tractor or aeroplane with but a minimum of alteration.

A still further object is to provide a structure of this character wherein the force of the exhaust is used as a means of vaporizing the water and delivering this water vapor into the stream of vaporized fuel.

Other objects will appear in the course of the following description.

My invention is illustrated in the accompanying drawings, wherein:—

Figure 1 is an elevation partly in section of my improved water vaporizing device for internal combustion engines, the exhaust and intake manifolds and the water container being in section;

Figure 2 is a longitudinal sectional view of the vaporizer proper on an enlarged scale;

Fig. 3 is a vertical central section of the constant level water container and controlling devices.

Referring to these drawings, 10 designates a water container, which may be of any suitable character and which is supported in any desired way upon any suitable support. This container is so disposed that the water level is normally about 1" below the vaporizer which will be hereafter described. The upper end of this water container is closed by a cover 10ª which is held in place preferably by bolts, and a pipe 12 enters the lower end of the water container or tank and leads from any suitable source of water, as from a water tank or from the radiator itself. Disposed within the container 10 is a float 13 which operates a float controlled valve 14 so as to maintain a constant level of water within the container. Extending from the lower end of the container is a pipe 14 which extends out through the nipple 15 in the container, which nipple in turn is connected to a pipe 16.

Extending through the wall of the exhaust manifold A of the engine is a pipe 17 whose inner end is turned upward or in a direction toward the upper end of the exhaust. This pipe 17 is connected to an elbow 18, which in turn is connected by screw-threads to a tubular chamber 19 having a relatively large diameter and whose extremity is reduced in size and screw-threaded, as at 20. This reduced extremity either connects directly to the intake manifold B or may be connected directly to the pipe carrying air to the carbureter or a pipe may be disposed between the reduced extremity 20 and the intake manifold or the pipe carrying air to the carbureter.

Disposed within the chamber 19 is an angular pipe 22, one end of which is disposed adjacent the outlet of the chamber 19 and concentric thereto. The other end of the pipe extends through the wall of the chamber 19 and is screw-threaded for engagement by a coupling 23, which in turn engages with the pipe 16 in an obvious manner. The pipe 22 has outwardly projecting lugs 24 which bear against the inner face of the wall of the chamber 19, and a nut 25 engages the projecting end of the pipe 22 with the wall of the chamber 19. The bore through the reduced end of the chamber 19 is approximately $\frac{7}{16}"$, while the outside diameter of the chamber 19 is approximately $\frac{1}{2}"$. The extremity of the pipe 22 is preferably $\frac{1}{16}"$ inside diameter.

In the operation of this invention, a portion of the exhaust gases are delivered to the pipe 17 and are forced through the pipe 17 into the chamber 19 and out through the reduced opening 20. The pressure of the exhaust through the vaporizer or chamber 19 causes a partial vacuum to be formed which sucks the water through tube 22 and the water is blown out of the small end of the jet pipe 22 in a fog-like vapor. This vapor is then sucked into the cylinder through the manifold with the vaporized fuel.

It will be seen that this device works automatically in that the production of water vapor is coincident with the running of the engine. While the force of the exhaust from one cylinder forces a spray from the vaporizer, the intake of another cylinder is opened and this vapor is sucked into this cylinder. Furthermore, the harder the engine is pulling, the more water it vaporizes and the more power is secured from the steam. I do not wish to be limited to the particular point of connecting the vaporizer to the exhaust manifold illustrated or to the particular manner of taking the exhaust from the manifold for use in vaporizing, nor to the particular point at which the vaporizer is connected to the intake of the engine, as the vaporizer might be connected to the air inlet for the carbureter or to the fuel intake for the engine. Preferably, however, it will be connected to the later, nor do I wish to be limited to the details of construction illustrated, as these might be modified in many ways without departing from the spirit of the invention.

I claim:—

1. A water vaporizer of the character described comprising a vaporizing chamber having a relatively small discharge bore, a water pipe entering said chamber through the side wall thereof and then extending longitudinally of the chamber concentric to the discharge bore and having a relatively small bore, means for connecting the vaporizing chamber to the engine exhaust, a water container connected to a source of water, a float valve controlling the passage of water into the water container, and a pipe leading from the water container to the water pipe in the vaporizer.

2. The combination with an internal combustion engine including an intake pipe line and an exhaust manifold, of means for discharging vaporized water into the intake pipe line comprising a vaporizing chamber having a reduced discharge end connected to the pipe line, a pipe leading from the other end of the vaporizing chamber and extending into the exhaust manifold, a water container, and a pipe line leading upward from the water container and extending into the vaporizing chamber and then extending longitudinally thereof concentric to the discharge bore of the vaporizing chamber, said pipe having a relatively small discharge bore.

3. The combination with an internal combustion engine having an exhaust manifold and an intake manifold, of means for discharging water vapor into the intake manifold comprising a vaporizer having a relatively small discharge bore, a pipe connection from the vaporizer to the exhaust manifold, a water container disposed below the vaporizer, a water discharge pipe disposed within the vaporizer and having a portion extending longitudinally thereof and concentric to the discharge bore of the vaporizer and smaller than said bore, and a pipe connection from said water pipe to the water container.

In testimony whereof I hereunto affix my signature.

OAK V. JEFFERIS.